US007624113B2

(12) United States Patent
Stuhec (10) Patent No.: US 7,624,113 B2
(45) Date of Patent: Nov. 24, 2009

(54) DATA ELEMENT NAMING SYSTEM AND METHOD

(75) Inventor: Gunther Stuhec, Heldelberg (DE)

(73) Assignee: SAP AG, Walldorf (DE)

( * ) Notice: Subject to any disclaimer, the term of this patent is extended or adjusted under 35 U.S.C. 154(b) by 317 days.

(21) Appl. No.: 11/286,762

(22) Filed: Nov. 23, 2005

(65) Prior Publication Data

US 2007/0118354 A1    May 24, 2007

(51) Int. Cl.
    *G06F 7/00* (2006.01)
(52) U.S. Cl. ........................ 707/100; 707/101
(58) Field of Classification Search ................. 707/100
    See application file for complete search history.

(56) References Cited

U.S. PATENT DOCUMENTS

| | | | | |
|---|---|---|---|---|
| 5,130,924 | A * | 7/1992 | Barker et al. ................. | 715/509 |
| 5,339,392 | A * | 8/1994 | Risberg et al. ............... | 715/762 |
| 6,124,391 | A * | 9/2000 | Sun et al. ..................... | 524/447 |
| 6,125,391 | A * | 9/2000 | Meltzer et al. .............. | 709/223 |
| 6,226,674 | B1 * | 5/2001 | Klish ........................... | 709/223 |
| 6,226,675 | B1 * | 5/2001 | Meltzer et al. .............. | 709/223 |
| 6,421,681 | B1 * | 7/2002 | Gartner et al. .......... | 707/103 R |
| 6,542,912 | B2 * | 4/2003 | Meltzer et al. ........... | 715/501.1 |
| 6,591,260 | B1 * | 7/2003 | Schwarzhoff et al. .......... | 707/2 |
| 6,941,511 | B1 * | 9/2005 | Hind et al. ................... | 715/523 |
| 7,028,312 | B1 * | 4/2006 | Merrick et al. .............. | 719/330 |
| 7,246,128 | B2 * | 7/2007 | Jordahl ........................ | 707/100 |
| 7,275,079 | B2 * | 9/2007 | Brodsky et al. ............. | 709/203 |
| 7,281,018 | B1 * | 10/2007 | Begun et al. ................. | 707/102 |
| 2003/0212904 | A1 * | 11/2003 | Randle et al. ................ | 713/200 |
| 2007/0150387 | A1 * | 6/2007 | Seubert et al. ................ | 705/31 |

OTHER PUBLICATIONS

Alan Stitzer, "UN/CEFACT (Core Components Technical Specification—Part 8 of the ebXML Framework)", Nov. 15, 2003, Version 2.01.*
Mark Crawford, "Oasis Universal Business Language (UBL) Naming and Design Rules", Nov. 15, 2004.*
http://www.flexisoftsolutions.com/Products/SM2004/SM2004.aspx—*FlexiSoft Solutions*, obtained from the Internet on Jun. 24, 2004, 4 pages.

(Continued)

*Primary Examiner*—John R. Cottingham
*Assistant Examiner*—Mohammed R Uddin
(74) *Attorney, Agent, or Firm*—Fish & Richardson P.C.

(57) ABSTRACT

A computer program for naming at least one of several data elements that can identify business information in a communication is described. Operations include associating a data element with an aggregate data element that includes one or more data elements. The data element is configured to have associated therewith an object class term that represents a logical grouping to which the data element belongs and a property term that represents a characteristic of the logical grouping. Also, the operations include selecting a data type that defines values that are valid for being assigned to the data element, wherein the data type includes a qualifier term that represents an additional semantic restriction describing the data type, and assigning the qualifier term to at least one of the property term and the object class term of the data element. The assignment is dependent upon a name of the aggregate data element.

18 Claims, 5 Drawing Sheets

OTHER PUBLICATIONS http://ww.notes.queensu.ca/uisadmin.nsf/579a5e3cc0e046c085256833007715cc/$FILE/queries_guide.pdf—BI/Query Queries Guide, *Hummingbird, Ltd.*, obtained from the Internet on Jul. 18, 2005, 6 pages.

"Core Components Technical Specification V2.01—Part 8 of the ebXML Framework," *UN/CEFACT*, document dated Nov. 15, 2003, 113 pages.

"Final Committee Draft ISO/IEC FCD—Information technology—Metadata registries (MDR)—Part 5: Naming and identification principles" *ISO/IEC*, document dated Jan. 8, 2004, 26 pages.

Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 12 pages.

"Information technology—Metadata registries (MDR)—Part 4: Formulation of data definitions," *ISO/IEC*, document dated Jul. 15, 2004, 16 pages.

"Information technology—Specification and standardization of data elements—Part 5: Naming and identification principles for data elements," *ISO/IEC*, document dated Dec. 1, 1995, 20 pages.

'Information Technology—Metadata Registries (MDR)—Part 5: Naming and identification principles' [online]. ISO, 2005 [retrieved on Feb. 23, 2007]. Retrieved from the Internet: <URL: http://metadata-standards.org/11179/#11179-5>, 22 pages.

* cited by examiner

DATA ELEMENT NAMING SYSTEM AND METHOD

TECHNICAL FIELD

This application relates to a data element naming system and method.

BACKGROUND

Companies have conventionally exchanged electronic business information using Electronic Data Interchange (EDI). EDI is a set of protocols that enable the transfer of data between different companies using networks, such as the Internet. Both the United Nations Joint European and North American working party (UN-JEDI) and the American National Standards Institute (ANSI) have developed standards that outline EDI. While EDI has allowed companies to communicate more efficiently than through the use of traditional paper-based communications, smaller companies face challenges to participate in electronic business (or electronic collaboration). These companies need to invest in complex and expensive computer systems to be installed at local computers, or to register with marketplaces at remote computers accessible through the Internet. In either case, the companies are bound by the particulars of the local or remote computer systems. Changes lead to further costs for software, hardware, user training, registration, and the like.

More recently, the development of the Extensible Markup Language (XML) has offered an alternative way to define formats for exchanging business data. XML provides a syntax that can be used to enable more open and flexible applications for conducting electronic business transactions, but does not provide standardized semantics for messages used in business processes. Initiatives to define standardized frameworks for using XML to exchange electronic business data have produced specifications such as the Electronic Business Extensible Markup Language (ebXML) Core Components Technical Specification (CCTS) and ISO 11179, a portion of which is incorporated in ebXML CCTS.

Two of the components that ebXML CCTS describes are data types and data elements. The data elements, such as Basic Business Information Entities (BBIEs), are based on the data types, which define the values which may be assigned to the BBIEs. Definitions describing attributes of the data types and BBIEs may be stored in a repository for future use. Users may search the repository using a data type or BBIE name. Standard naming conventions and definition guidelines for the data types and data elements are not specified in some regards by the ebXML CCTS, which results in inconsistent names and attribute definitions. For example, two users may create BBIE names using two different methods. In another example, different users may restrict similarly modified data types in inconsistent ways. The inconsistent definition of data types decreases the ability of businesses to exchange BBIEs based on the data types because the limits of the value ranges are more uncertain.

Additionally, the names of objects instantiated using the definitions in the repository may be inconsistent, which may cause difficulty in cross-business communication because the different naming conventions and attribute definitions may lead to system communication incompatibility and user confusion.

SUMMARY

The present application describes methods and apparatus, including computer program products, that implement techniques naming data elements that identify business information in a communication.

In one general aspect, a computer program product tangibly embodied in an information carrier is described. The computer program product includes instructions that, when executed, perform operations for naming at least one of several data elements that can identify business information in a communication. The operations include associating a data element with an aggregate data element that includes one or more data elements. The data element is configured to have associated therewith an object class term that represents a logical grouping to which the data element belongs and a property term that represents a characteristic of the logical grouping. Also, the operations include selecting a data type that defines values that are valid for being assigned to the data element, wherein the data type comprises a qualifier term that represents an additional semantic restriction describing the data type, and assigning the qualifier term to at least one of the property term and the object class term of the data element. The assignment is dependent upon a name of the aggregate data element.

In one implementation, the aggregate data element may be configured to have associated therewith an aggregate class term that semantically defines the logical grouping. The qualifier term may be assigned to the object class term if the qualifier term is identical with the aggregate class term or the qualifier term is assigned to the property term if the qualifier term is not identical with the aggregate class term.

In another implementation, the operations may further include determining whether the qualifier term is assigned to the property term or the object class term by comparing the name of the aggregate data element to the qualifier term, wherein the name comprises an aggregate class term. The determination may be made to assign the qualifier term to the object class term if the qualifier term is identical with the aggregate class term. The data element may be further configured to have associated therewith an object class term qualifier that semantically restricts the object class term, wherein the data type further comprises an additional qualifier term that further semantically restricts the data type, and wherein the operations further comprise assigning the additional qualifier term of the data type to the object class term qualifier. Also, the determination may be made to assign the qualifier term to the property term if the qualifier term is not identical with the aggregate class term.

The data element may be further configured to have associated therewith a property term qualifier that semantically restricts the property term, wherein the data type further comprises an additional qualifier term that further semantically restricts the data type, and wherein the operations further comprise assigning the additional qualifier term of the data type to the property term qualifier.

In another implementation, the data element may be further configured to have associated therewith a property term qualifier that semantically restricts the property term and an object class term qualifier that semantically restricts the object class term. The operations may further comprise receiving an additional qualifier term from a user and assigning the additional qualifier term to the property term qualifier, the object class term qualifier, or both.

The data type may further include a data type term that is semantically restricted by the qualifier term, wherein the data element is further configured to have associated therewith a representation term, and wherein the data type term is assigned to the representation term. Moreover, the data type may further include additional qualifier terms, wherein each additional qualifier term further semantically restricts the data type. The data element may be further configured to have associated therewith a property term qualifier that semantically restricts the property term, and wherein the operations further comprise assigning an additional qualifier term of the data type to the property term qualifier if the additional qualifier term is not identical with a term in the name of the aggregate data element or assigning the additional qualifier term of the data type to at least a portion of the object class term of the data element if the additional qualifier term is identical with a term in the name of the data aggregate element.

In some implementations, each qualifier term may be associated with a restriction in values the data type may represent, and the operations may further include associating a new data type definition with each restricted data type.

In other implementations, the data type is an aggregate data type, and the data element may be a basic business information entity or an association business information entity compatible with Core Components Technical Specification. The qualifier term may also be a variable qualifier term that is a place holder for another qualifier term. The variable qualifier term may include all capital letters and begin and end with non-alphanumeric symbols.

In another general aspect, a system for assigning a name to at least one element that represents business information is described. A system includes a data element configured to have associated therewith an object class term that represents a logical grouping to which the data element is associated, and a property term that represents a characteristic of the logical grouping. The system also includes an aggregate data element that defines the logical grouping, a data type that defines values that are valid for being assigned to the data element, wherein the data type comprises a qualifier term that represents an additional semantic restriction describing the data type, and a name assignor that assigns the qualifier term to at least one of the property term and the object class term of the data element, the assignment being dependent upon a name of the aggregate data element.

In yet another general aspect, a method for naming a data element that identifies business information in a communication is described. The method includes associating a data element with an aggregate data element that includes one or more data elements, wherein the data element is configured o have associated therewith an object class term that represents a logical grouping to which the data element belongs and a property term that represents a characteristic of the logical grouping. The method also includes selecting a data type that defines values that are valid for being assigned to the data element, wherein the data type comprises a qualifier term that represents an additional semantic restriction describing the data type, and assigning the qualifier term to at least one of the property term and the object class term of the data element, the assignment being dependent upon a name of the aggregate data element.

Advantages of the systems and techniques described herein may include any or all of the following: Improving the consistency of naming conventions of data types and data elements; providing an enforcement mechanism for consistent naming of data types and data elements; providing improvement in cross-business communications; providing a logical and uniform standard for defining data type and data element names; and simplifying the creation process of data element, entities, attributes, and data type names.

The details of one or more embodiments are set forth in the accompanying drawings and the description below. Other features, objects, and advantages of the implementations will be apparent from the description and drawings, and from the claims.

DESCRIPTION OF DRAWINGS

Like reference symbols in the various drawings indicate like elements.

DETAILED DESCRIPTION

Figure 1A:
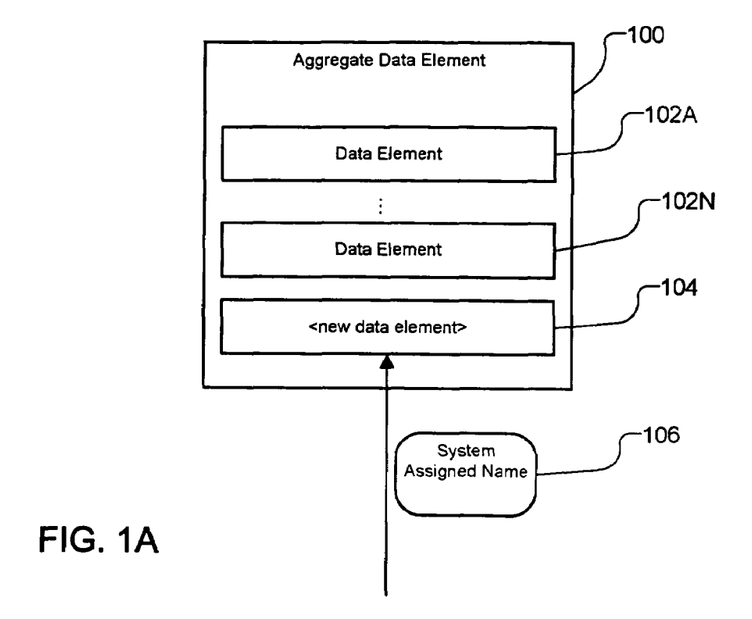
FIG. 1A is a schematic diagram of an exemplary aggregate data element and associated data elements that are used to represent business data.

FIG. 1A is a schematic diagram of an exemplary aggregate data element instance 100 and associated data element instances (referred to as "data elements" for simplicity) 102A-N that are used to represent business data. For example, the aggregate data element instance may be an instantiated software object representing a purchase order. The data elements 102A-N represent subcomponents, or properties, of the purchase order. For example, data element 102A may be a property for a buyer's name, and it may hold the text string value "John Smith." The collection of data elements, or properties, forms the aggregate data element instance 100.

A user or developer modifying the aggregate data element instance 100 may add a new data element 104 to expand the aggregate data element's definition. For example, a modeler may add a property that holds a date value describing when the item specified by the purchase order must be shipped. The modeler assigns the new data element a name 106 when the element is created using the system shown in FIG. 1B.

Figure 1B:
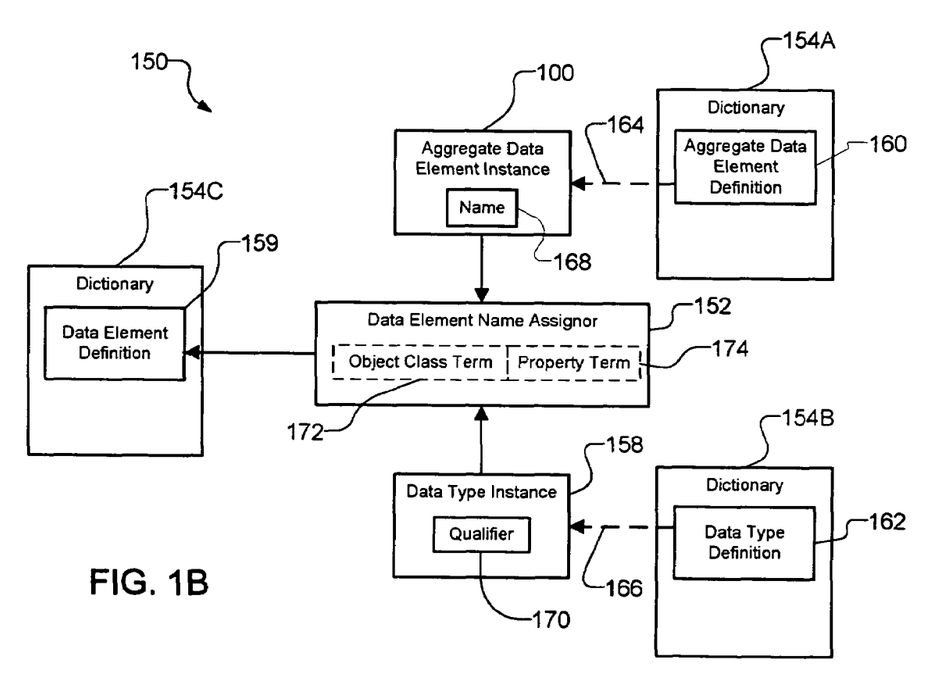
FIG. 1B is a block diagram of an exemplary system for naming the data elements shown in FIG. 1A.

FIG. 1B is a block diagram of an exemplary system 150 for naming the data elements shown in FIG. 1A. The system 150 may use naming rules to ensure the data elements are assigned names in a consistent way. The system 150 includes a data element name assignor 152, dictionaries 154A-C, the aggregate data element instance 100, and a data type instance 158. The name assignor 152 uses the data type instance 158 and the aggregate data instance 100 to create a name for a data element and associates the name with a data element definition 159 in the dictionary 154C. This will be explained in more detail below.

The dictionary 154A includes an aggregate data element definition 160 that is used to create the aggregate data element instance 100. In one implementation, the definition 160 may be a class definition, which is used to instantiate the aggregate data element instance. Similarly, the dictionary 154B includes a data type definition that is used to create the data type instance 158. The dashed arrows 164, 166 pointing from the aggregate data element definition 160 and the data type definition 162 indicate the instantiation of the aggregate data element instance 100 and the data type instance 158, respectively.

The aggregate data element instance 100 has a name 168, which may include one or more terms that describe the logical grouping of data elements it includes. Using the example above, the aggregate data element may be named Purchase_Order. Details, where the text "Purchase_Order" specifies that the data elements included in the aggregate data element are properties of a purchase order.

The data type instance 158 also has a name that includes a qualifier term 170. The qualifier term restricts other terms of the date of type. The additional qualifier terms restrict the semantic meaning for the data type. For example, if the data type's name is US_Person. Type, the qualifier term "US" modifies the term "Person" and restricts the meaning of the data type from any person to a person residing in the United States. Additionally, in one implementation, the semantic restriction is associated with a physical restriction. For example, if the data type's name is Person_Name. Type, the data type may have a string property with a length of 1000 characters. When the data type name is semantically restricted as US_Person_Name. Type, the string property is physically restricted to a string of only 100 characters.

The named to be assigned to the new element includes an as-yet unassigned object class term 172 and an as-yet unassigned property term 174. The data element name assignor 152 uses a method described in association with FIG. 3 to assign the new element a name. The assignment includes assigning the qualifier. 170 of the data type instance 158 to either the object class term 172 or the property term 174 of the new data element depending on the name 168 of the aggregate data element instance 100. The data element name assignor 152 then associates the new data element's name with the corresponding data element definition in dictionary 154C.

Figure 2:
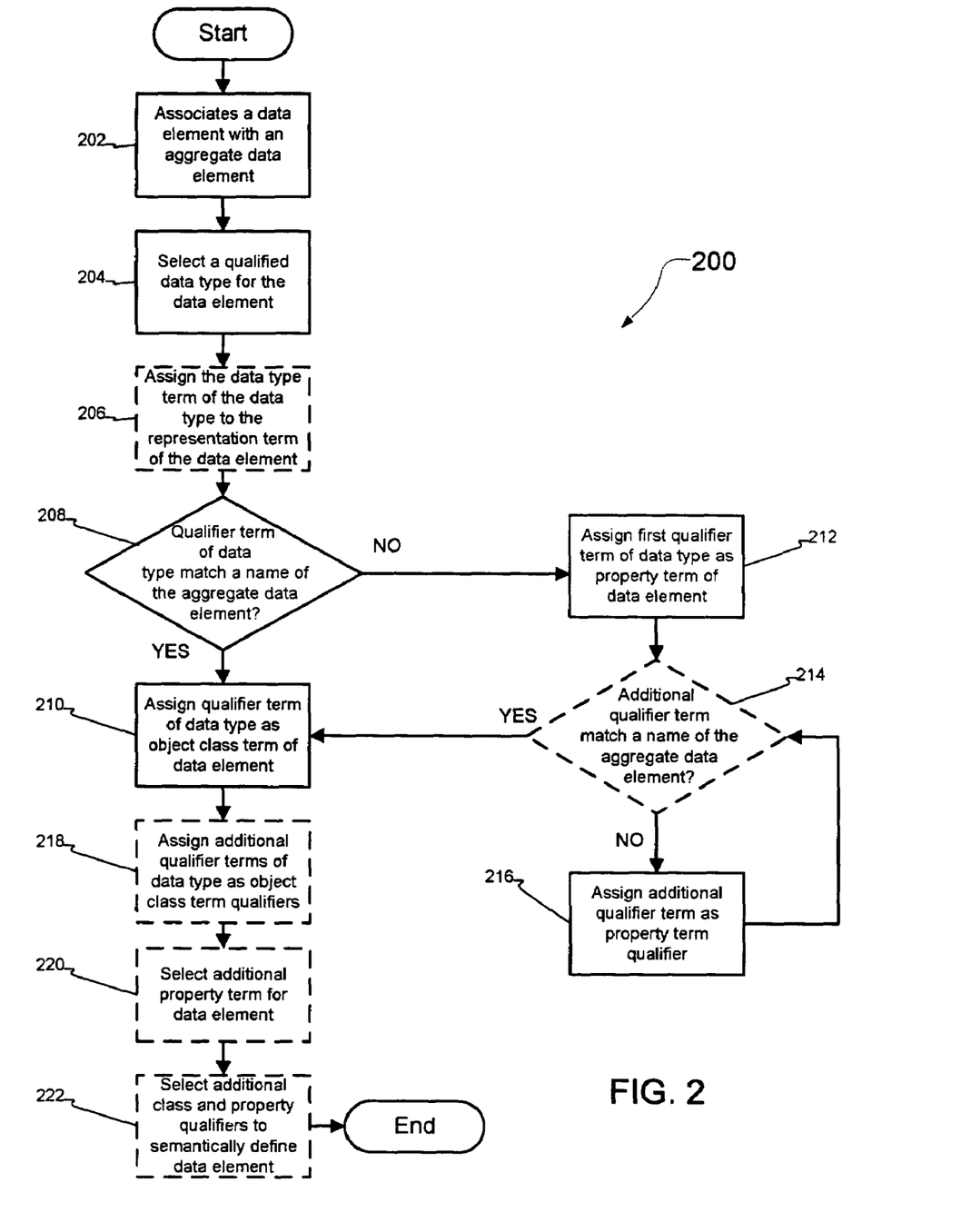
FIG. 2 is a flow chart of a method for naming the data elements according to one implementation.

FIG. 2 is a flow chart of a method 200 for naming the data elements according to one implementation. For example, the operations of the method 200 can be performed by a computing device that includes the data element name assignor 152. The method 200 may begin in step 202 with associating a data element with an aggregate data element. A data element may be associated with an aggregate data element that includes one or more data elements. The data element is configured to have associated therewith an object class term that represents a logical grouping to which the data element belongs and a property term that represents a characteristic of the logical grouping. For example, a user may initiate the creation of the new data element 104 in the aggregate data element 100, such as initiating the instantiation of a "delivery date" data element within a "purchase order" aggregate data element.

In step 204, a selection of a qualified data type for the data element is performed. A data type is selected that defines values that are valid for being assigned to the data element as well as a physical representation of the data element. The data type comprises a qualifier term that represents an additional semantic restriction describing the data type. The data type may also include the restriction of a physical representation of the value, which is required for an additional semantic restriction. For example, if a data type is Person_Name. Type, it may have a physical restriction of 1000 characters associated with a string property. This physical restriction may be associated with the additional semantic restrictor "Person." A data type without the semantic restrictor, for example, Name. Type, may have a less restrictive physical restriction, such as 5,000 characters associated with the string property. In some implementations, a user may select a data type on which to base the element. For example, a user may input a selection designating a data type "Country_Code. Type," which may be assigned values that identify specific countries. The user's selection is received by the data element name assignor 152 and used to select the specified data type. The selected data type is then used restrict the physical representation of values that may be assigned to the data element.

In optional step 206, an assignment of the data type term to the representation term is performed. The data type may also include a data type term that is semantically restricted by the qualifier term, and the data element may also include a representation term. The data type term is assigned to the representation term. For example, the data type "Country_Code. Type" has a qualifier "Country" and a data type term "Code." The qualifier term "Country" restricts what the data type term "Code" can mean, and in this case, "Code" is limited to represent codes for countries. The data element may include three terms: the object class term, the property term, and, additionally, the representation term. If the unassigned data element terms are ObjectClassTerm. PropertyTerm. RepresentationTerm, the assignment of the data type term to the representation term results in the partially assigned data element "ObjectClassTerm. PropertyTerm. Code." The data element name assignor 152 shown in FIG. 2 may perform this assignment.

In step 208, it is determine whether the qualifier term of the data type matches the aggregate data element name. The operations of method 200 includes determining whether the qualifier term is assigned to the property term or the object class term by comparing the name of the aggregate data element to the qualifier term, where the name of the aggregate data element includes an aggregate class term. For example, the data element name assignor 152 may determine to assign the qualifier term to the object class term if the qualifier term is identical with the aggregate class term, and the method 200 advances to step 210. Alternatively, the data element name assignor 152 may determine to assign the qualifier term to the property term if the qualifier term is not identical with the aggregate class term, and the method 200 advances to step 212.

For example, the name of the aggregate data element may be "Country. Details," and the aggregate class term is the word "Country." The data type may be "Country_Code. Type." In step 208 the system 150 determines that the data type qualifier "Country" matches the aggregate class term "Country" and the method advances to step 210. If, in contrast, the data type were "Country_Identification_Code. Type," the method would advance to step 212 because the first qualifier term "Identification" would not match the aggregate class term "Country."

In step 212, "Assign first qualifier term of data type as property term of data element" is performed. The qualifier term is assigned to the property term or the object class term of the data element, where the assignment is dependent upon the name of the aggregate data element. Therefore, if the determination step 208 results in the method advancing to step 212, the first qualifier term of the data type is assigned as the property term of the data element. Using the example above, if the data type is "Country_Identification_Code. Type" and the aggregate data elements is "Country. Details," then the data element name assignor 152 assigns the data type qualifier "Identification" as the property term of the data element, such as Country. Identification. Code, where the word "Country" is the object class term, the word "Identification" is the property term, and the word "Code" is the representation term.

In an optional step 214, it is determine whether an additional qualifier term matches the aggregate data element name. The data type may have more than one qualifier term, such as Country_Identification_Code. Type, where "Identification" is the first qualifier term, and "Country" is the second qualifier term. If the additional qualifier term "Country" matches a name of the aggregate data element, then the method 200 advances to step 210. If the additional qualifier term does not match a name of the aggregate data element, then the method 200 advances to step 216.

In step 216, an assignment of the additional qualifier as the property term qualifier is performed. The data element also includes a property term qualifier that semantically restricts the property term. The data type further includes in the additional qualifier term that further semantically restricts the data type, and execution of the step 216 may assign the additional qualifier term of the data type to the property term qualifier. For example, if the data type is "Country_Numeric_Identification_Code. Type," the first qualifier is "Identification" and the second qualifier is "Numeric." If the aggregate class name is "Country. Details," the data element name is "Country. Numeric_Identification. Code," where the data name element assignor 152 assigns "Numeric" as a property term qualifier that semantically restricts the property term. "Identification." This restricted semantic description now describes a data element that is assigned numeric identification codes instead of, for instance, alpha-numeric identification codes. If the data type contains multiple qualifier terms, the optional determination step 216 may be repeated.

In step 210, and assignment of the qualifier code term as the object class term is performed. The execution of the method 200 performs step 210 when the qualifier term of the data type matches the name of the aggregate data element. For example, the aggregate data element may be "Country. Details" and the data type may "Country_Code. Type." Here, the generated data element name is "Country. Identification. Code," where the data element name assignor 152 assigns the data type qualifier "Country" as the object class term of the data element.

In optional step 218, assignment of additional qualifier terms as object class term qualifiers is performed. The data element may include additional object class term qualifiers that semantically restrict the object class term. As mentioned above, the data type may also include additional qualifier terms that semantically restrict the data type. Additionally, this data type may be physical restricted according the requirements given by the semantic. For example, the addition of a qualifier term "Person" to the data type Name. Type, may restrict a string of characters in the data type from 5,000 to 1,000 characters. The data element name assignor 152 may assign additional data type qualifier terms as object class term qualifiers. For example, if the data type is "Automobile_Purchase Order_Form_Code. Type, the first qualifier term is "Form," the second qualifier term is "Purchase Order," and the third qualifier term is "Automobile." If the "Purchase Order" qualifier matches the name of the aggregate data element, the data element name assignor 152 assigns this qualifier as the data element class object term, and the qualifier term "Automobile" is assigned as a class object term qualifier. More explicitly, the assigned data element name is "Automobile_Purchase Order. Form. Code."

In optional step 220, a selection of an additional property term for the data element is performed. A user may select a property term for the data element if the property term is not assigned based on a qualifier term of the data type. For example, the data type may be "Country_Code. Type," and the aggregate data element may be "Country Details." Execution of the steps 202-218 then results in the data element lacking a property term. A user may select and input "Identification" as a proper term to semantically restrict the code values. A computing device communicating with the data element name assignor 152 may pass the user input to the assignor 152, which then assigns the input "Identification" as the property term. This assignment results in the data element name "Country. Identification. Code."

In optional step 222, a selection of additional class and property qualifiers is performed. The property term may be semantically restricted by a property term qualifier, and the object class term may be semantically restricted by an object class term qualifier. A user may assign additional qualifier terms (which are not present in the data type name) to the object class term, the property term, or both. The user may input the qualifiers in a method similar to that described in association with step 220, which describes user addition of a property term. After step 222, the method 200 terminates.

Figure 3A:
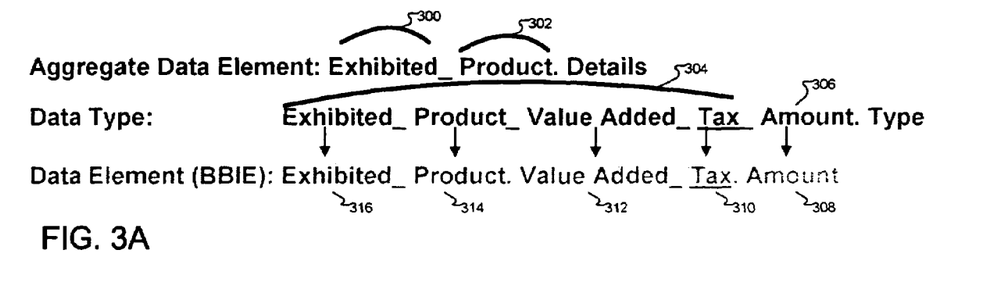
FIGS. 3A-3D show exemplary applications of naming rules that may be used in the method of FIG. 2.

FIGS. 3A-3D shows exemplary application of naming rules that may be used in the method of FIG. 2 or in the system 150, to name two examples. The example in FIG. 3A shows a situation in which the name assignor assigns the first qualifier of a data type element as the property term of a data element. The FIG. 3A includes an aggregate data element name "Exhibited_Product. Details," the data type name "Exhibited_Product_Value Added_Tax_Amount. Type," and a data element name "Exhibited_Product. Value Added_Tax. Amount," which is generated by the data element name assignor 152 using the aggregate data element and data type names.

The aggregate data element name includes an aggregate class term 302 that reads "Product" and an aggregate class term qualifier 300 that reads "Exhibited." The data type name includes qualifier terms 304 that read "Exhibited_Product_Value Added_Tax_" and a data type term 306 that reads "Amount." The data element name includes a representation term 308, a property term 310, a property qualifier term 312, an object class term 314, and an object class qualifier term 316. The assignor 152 assigns the data type term 306 as the representation term 308. Also, the data element name assignor 152 determines that the first qualifier term that reads "Tax" does not match the aggregate class term 302, so the assignor 152 assigns the qualifier term that reads "Tax" as the property term 310, which corresponds to the assignment in step 212 in the exemplary method 200.

The assignor then determines that the next data type qualifier "Value Added" does not match the aggregate class term, so it assigns this qualifier as the property term qualifier 312. This determination and assignment corresponds to the steps 214 and 216 in the exemplary method 200. The assignor 152 then determines that next qualifier term that reads "Product" is identical to the aggregate class term 302, so it assigns this qualifier term as the object class term 314. This determination and assignment corresponds to the steps 214 and 210 in the exemplary method 200. The assignor also assigns the remaining qualifier term that reads "Exhibited" as the object class qualifier term 316, which corresponds to the step 218 in the exemplary method 200.

In one implementation, the aggregate data element is an aggregate business information entity (ABIE), the data element is a basic business information entity (BBIE), and the data type is a data type, each implemented as described in the Electronic Business Extensible Markup Language (ebXMLY) Core Components Technical Specification (CCTS) Version 2.01 published by the United Nations Centre for Trade Facilitation and Electronic Business on Nov. 15, 2003, and incorporated in its entirety herewithin. The ABIE may describe a business object, such as a purchase order, used in communications between businesses. The BBIE may represent a property, or a characteristic, of the ABIE, such as the quantity of an order item specified by the purchase order. The data type may define values that are assigned to the BBIE. For example, if a BBIE is based on a "Text. Type" data type, only text strings may be assigned to the BBIE.

Figure 3B:
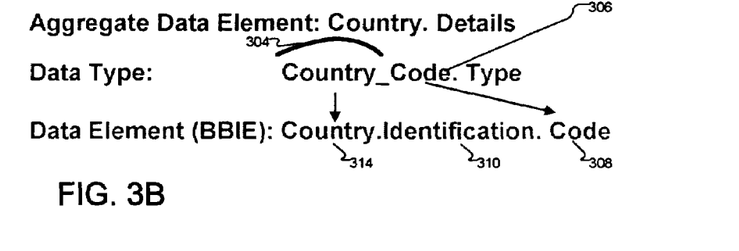

The example in FIG. 3B shows a situation in which the first qualifier is identical to the aggregate class term. The FIG. 3B includes an aggregate data element name "Country. Details" and a data type name "Country_Code. Type." Using these, the data element name assignor 152 generates a data element name "Country. Identification. Code." In this example, the assignor 152 assigns the data type term 306 that reads "Code" as the representation term 308. The first qualifier term 304 of the data type that reads "Country" is identical to the aggregate class term that reads "Country" of the aggregate data element, so the assignor 152 assigns the qualifier term 304 as the object class term 314 of the data element. This determination and assignment correspond to the steps 208 and 210 in the exemplary method 200 of FIG. 2.

Also, the user may select and input a property term value into a computing device in communication with the data element name assignor 152. Here, the user entered the term that reads "Identification," and the assignor 152 assigned the term as the property term 310. This corresponds to the step 220 in the exemplary method 200.

Figure 3C:
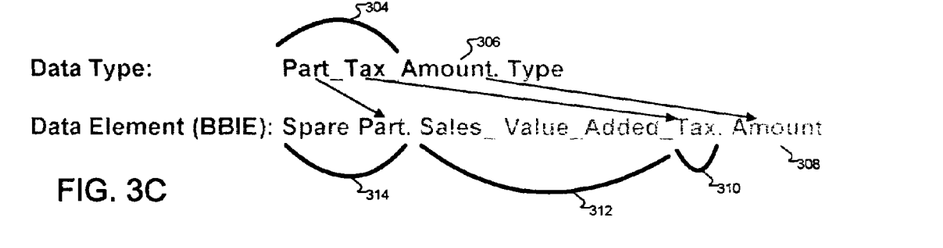

The example in FIG. 3C shows a situation in which the data element name assignor 152 assigns a qualifier term as a portion of the object class term. As discussed in association with FIGS. 3A and 3B, the assignor 152 assigns the data type term 306 that reads "Amount" as the representation term 300 28, assigns the first qualifier term that reads "Tax" as the property term 310, and assigns the property term qualifiers 312 based on user input. The second data type qualifier that reads "Part" is identical with a portion of the aggregate class term that reads "Spare Part" (not shown in FIG. 3C), so the assignor assigns the qualifier term that reads "Part" as a portion of the class object term 314. This determination and assignment also corresponds to the step 210 in the exemplary method 200 of FIG. 2.

Figure 3D:
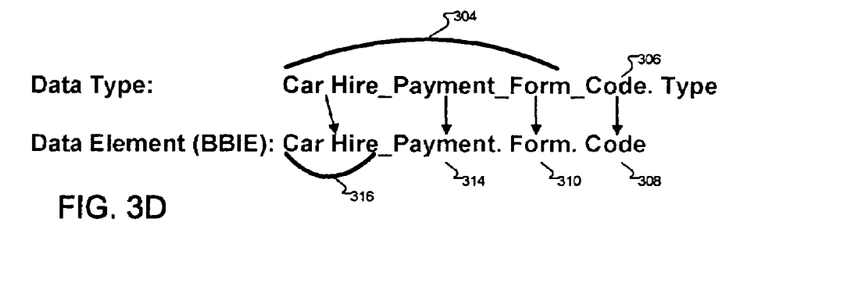

The example in FIG. 3D shows a situation similar to the example of FIG. 3A. Here, the data name assignor 152 assigns the data type term 306 that reads "Code" as the representation term 308 of the data element. The first qualifier term of the data type's qualifier terms 304 that reads "Form" is assigned as the property term 310 because it does not match the aggregate class term ("Car Hire_Payment. Details," which is not shown). The second qualifier term that reads "Payment" is assigned as the object class term 314, and the third qualifier term that reads "Car Hire" is assigned as the object class qualifier term 316 of the data element.

Figure 4A:
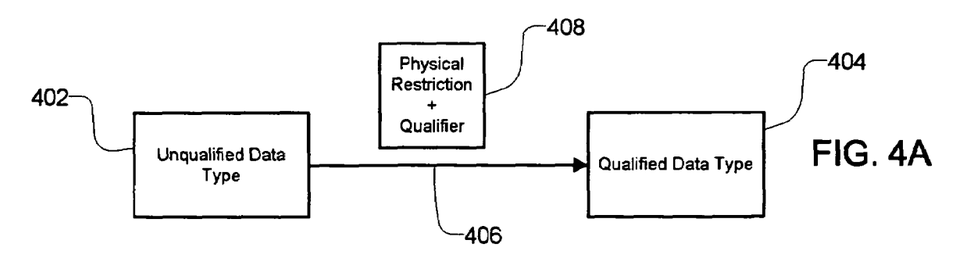
FIGS. 4A and 4B show an exemplary block diagram and an exemplary implementation, respectively, that illustrate the process of restricting a data type, which is used in the naming of the data elements shown in FIG. 1.
Figure 4B:
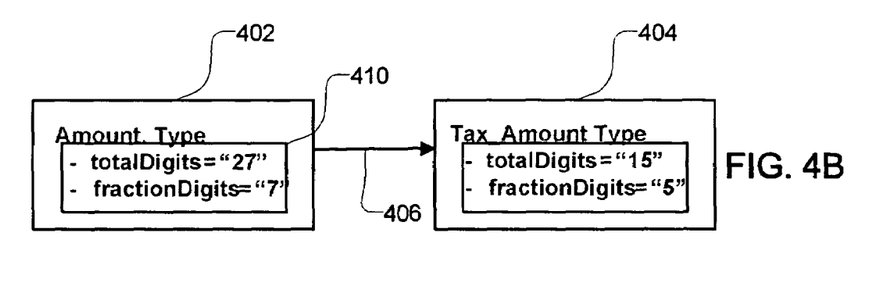

FIGS. 4A and 4B show an exemplary block diagram and an exemplary implementation, respectively, that illustrate the process of restricting a data type, which is used in the naming of the data elements shown in FIG. 1. The FIG. 4A includes an unqualified data type 402 and a qualified data type 404. An arrow 406 indicates a transition from the unqualified data type to the qualified data type. The system 150 of FIG. 1B may accomplish the transition to the qualified data type 404 by adding a physical restriction and a qualifier term 408 to the unqualified data type 402.

The system 150 may select the unqualified data type 402 from a predetermined set of unqualified data types stored in a repository accessible by the system 150. Each unqualified data type in the repository may express the maximum unrestricted semantic representation of a specific representation term. The qualified data types may also express the maximum unrestricted physical representation of a specific representation term. For example, as shown in FIG. 4B, the unqualified data type 402 may be "Amount. Type," which expresses the unqualified and most basic semantic representation for the "Amount" representation term because it has no qualifiers to semantically restrict it. Additionally, the unqualified data type 402 has physical restrictions 410, which includes a "totalDigit" property that limits to "27" the number of total digits the data type may represent. The physical restrictions 410 also include a "fractionDigits" property that limits to "7" the number of fractional digits the data type may represent. The physical restrictions of the unqualified data type express the maximum number of total and fractional digits the data type may represent for any use of the data type.

The system 150 of FIG. 2 may generate a qualified data type 404 based on the unqualified data type 402. A user may select an unqualified data type upon which to base a qualified data type. The user may also enter increased physical restrictions, which specify that only a subset of the unqualified physical restrictions may be assigned to the qualified data type. The user may also enter a qualifier term for the new qualified data type. The system 150 may receive this input and generate a corresponding qualified data type, such as the qualified data type 404 "Tax_Amount. Type" in FIG. 4B.

The addition of the qualifier term "Tax" semantically restricts the data type to meanings in which the amount is a tax amount. Additionally, the physical restrictions "15" and "5" for the totalDigits and fractionDigits properties, respectively, are a subset of the values that may be represented by the unqualified data type "Amount. Type." The selection of a subset of values physically restricts the qualified data type 404 relative to the unqualified data type 402.

Although not shown in FIGS. 4A and 4B, the system 150 may add additional physical restrictions and qualifier terms 408A-N to the qualified data type 404 to generate qualified data types with multiple qualifier terms and corresponding physical restrictions. For example, the system 150 may add a qualifier term "US" to the qualified data type 404 to generate the further qualified data type "US_Tax_Amount. Type." This further qualified data type may have corresponding physical restrictions, such as totalDigits "8" and fractionDigits="4."

When the system 150 generates a new qualified data type, a definition associated with the new qualified data type may be stored in a repository accessible by the system 150. The definition may serve as a template for creation of future instances of the new qualified data type.

In some implementations, the data type may be an aggregate data type. The system 150 may generate aggregate data elements based on the aggregate data type in a manner similar to the methods described in this application for generation of data elements based on data types.

Figure 5:
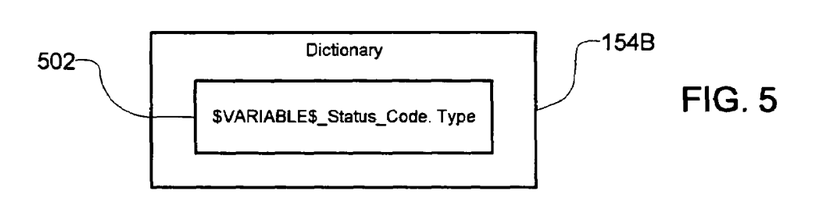
FIG. 5 is an exemplary block diagram of a data type with a variable qualifier used to restrict the data type.

FIG. 5 is an exemplary block diagram of a data type with a variable qualifier used to restrict the data type. FIG. 5 shows a dictionary 154B that includes several data type definitions. At least one data type definition 502 includes a variable qualifier term, such as "LONG," "INTEGER," and "WITHOUT_DAYLIGHT SAVING." The "$" symbols at the beginning and ending of the variable qualifier term indicate to users and the system that the term is a variable qualifier term and not a standard qualifier term. Data types with variables names are abstract data types. The variable qualifier term represents the specific meaning of the abstract data type. Use of the variable qualifier term conveys a technical restriction for the data type in a semantic manner without actually specifying a particular qualifier term that physically restricts the data type. For example, a data type with a variable qualifier term may be "$INTEGER$_Numeric. Type." The variable qualifier term indicates that the data type is restricted to integer values, but does necessarily restrict the data type physically, such as the number of integers that may be represented. In some implementations, the variable qualifier term is not used for qualified data types, which are based on and represent a semantic and physical restriction. Additionally, the variable term may be indicated by capitalizing all the letters in the term. The type name of the data type of the variable qualifier term may consist of an underscore followed by the variable term and then another underscore, such as "_INTEGER_."

Use of variables in data type names enables automatic generation, of specific data types by the system 150. For example, a generalized data type "$COUNTRY_SPECIFIC$_Tax_Amount. Type" may include physical restrictions "totalDigits=27" and "fractionDigits=7." These physical restrictions may be adequate for a variety of data types, such as "US_Tax_Amount. Type" and "DE_Tax_Amount. Type," which specify permissible tax amount values for United States and German tax amounts. The system 150 may generate specific data types from the generalized data type by replacing the term $COUNTRY_SPECIFIC$ with a qualifier term associated with a specific context. For example, if a new purchase order is created for use by United States and German companies, the system may access the generalized data type "$COUNTRY_SPECIFIC$_Tax_Amount. Type" and replace the term $COUNTRY_SPECIFIC$ with US and DE, which creates the new data types "US_Tax_Amount. Type" and "DE_Tax_Amount. Type," respectively.

Figure 6:
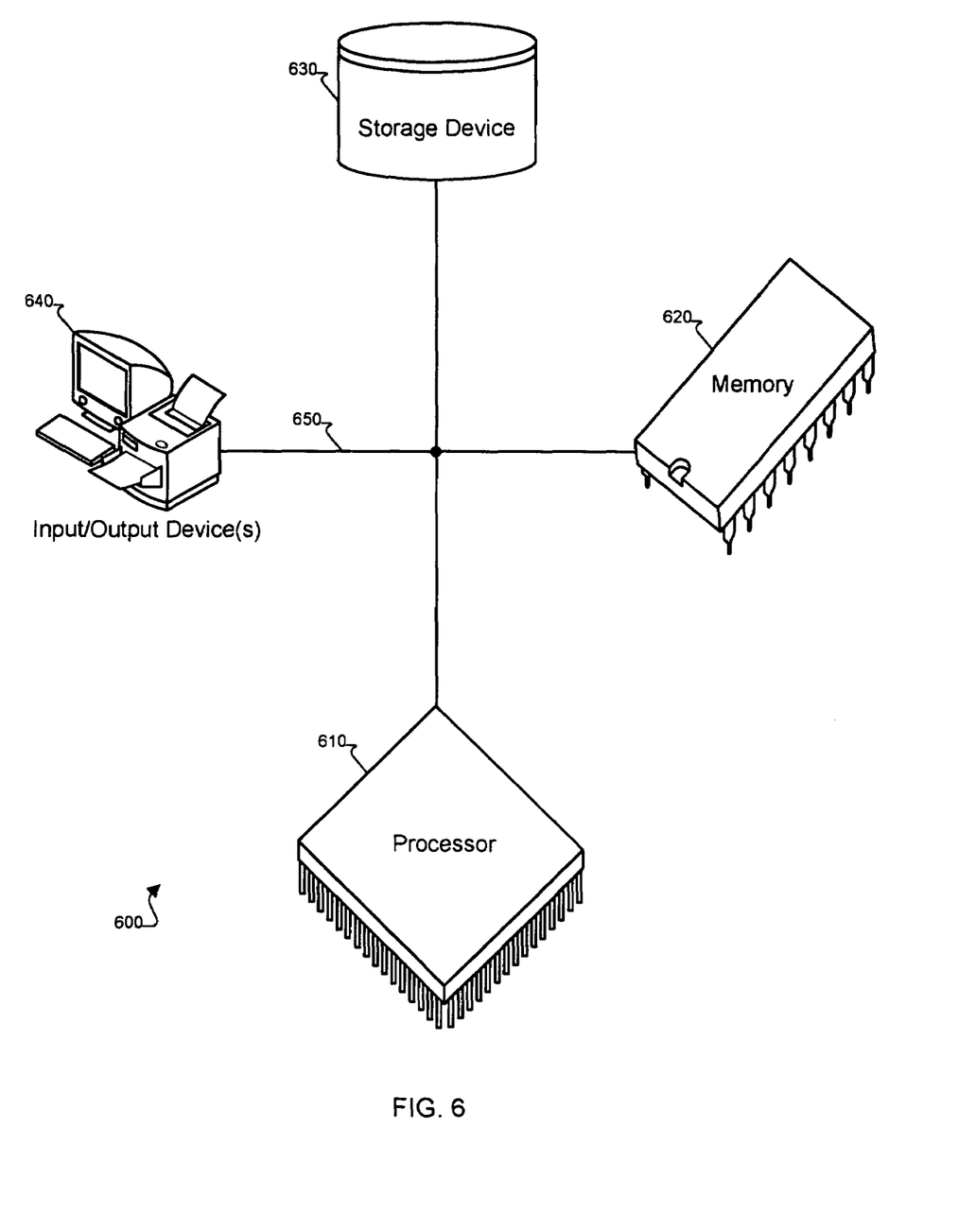
FIG. 6 is a schematic diagram of a general computer system.

FIG. 6 is a schematic diagram of a general computer system 600 that can be used in the operations described above, according to one implementation. The system 600 includes a processor 610, a memory 620, a storage device 630 and an input/output device 640. The system 600 may be part of the system 150 and used to perform the method 200 of FIG. 2. Each of the components 610, 620, 630 and 640 are interconnected using a system bus 650. For example, a GUI abstraction employed by a user to enter input, such as property terms for data elements, can be generated on the input/output device 640, and the input may be communicated to the other components in the system 600 using the system bus 650.

The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630, including for receiving or sending information through the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces.

The described embodiments can be implemented in digital electronic circuitry, or in computer hardware, firmware, software, or in combinations of them. Apparatus can be implemented in a computer program product tangibly embodied in an information carrier, e.g., in a machine-readable storage device, for execution by a programmable processor; and method steps of the described implementations can be performed by a programmable processor executing a program of instructions to perform functions of the various embodiments by operating on input data and generating output. The various embodiments can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the various embodiments can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The various embodiments can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of various embodiments have been described. Nevertheless, it will be understood that various modifications may be made without departing from the spirit and scope of the implementations described in this application. For example, the term used as a variable in the data type may include any term or terms agreed upon. In other implementations, only a preset list of variable names may be used for variable qualified data types.

Property terms and additional qualifier terms do not necessarily have to be input by a user. Alternatively, the system 150 may generate the property and additional qualifier terms based on the context in which the data elements are generated. For example, if the aggregate data element is a purchase order for use by companies in the United States and Germany, an additional qualifier term "US" may be generated for the data element "Purchase Order. US_Tax. Amount" to differentiate it from the data element "Purchase Order. DE_Tax. Amount," which is used to calculate a German tax amount.

Additionally, qualified data types are not necessarily more physically restricted than the data types upon which they are based. For example, the data type "Tax_Amount. Type" may have a property "totalDigits=27," and a data type "US_Tax_Amount. Type," which is based on that data type, may also have a property "totalDigits=27."

In another implementation, dictionaries 154A-C may be consolidated into one dictionary, which includes definitions for aggregate data elements, its data types, and data elements. The system 150 may access these definitions from the single dictionary to instantiate corresponding objects.

Also, the logic flows depicted in the figures do not require the particular order shown, or sequential order, to achieve desirable results. Other steps may be provided, or steps may be eliminated, from the described flows, and other components may be added to, or removed from, the described systems. Accordingly, other embodiments are within the scope of the following claims.

What is claimed is:

1. A computer program product tangibly embodied in a computer-readable medium, the computer program product including executable instructions for performing operations for naming at least one of several data elements that can identify business information in a communication, the operations comprising:
    associating a data element with an aggregate data element that includes one or more data elements, wherein the data element is configured to have associated therewith an object class term that represents a logical grouping to which the data element belongs and a property term that represents a characteristic of the logical grouping,
    selecting a data type that defines values that are valid for being assigned to the data element, wherein the data type comprises a qualifier term that represents an additional semantic restriction describing the data type;
    assigning the qualifier term to a selected one of the property term and the object class term of the data element-based upon a name of the aggregate data element, wherein the aggregate data element is configured to have associated therewith an aggregate class term that semantically defines the logical grouping, and wherein the qualifier term is assigned to the object class term upon a determination that the qualifier term is identical with the aggregate class term, and wherein the qualifier term is assigned to the property term upon a determination that the qualifier term is not identical with the aggregate class term; and
    associating at least the object class term, the property term and the qualifier term assigned to one of the object class term and the property term into a name for the data element.

2. The computer program product of claim 1, wherein assigning the qualifier term to a selected one of the property term and the object class term of the data element-based upon a name of the aggregate data element comprises selecting one of the property term and the object class term for the qualifier term to be assigned to, by comparing the name of the aggregate data element to the qualifier term, wherein the name comprises an aggregate class term.

3. The computer program product of claim 2, wherein the qualifier term is assigned to the object class term upon a determination that the qualifier term is identical with the aggregate class term.

4. The computer program product of claim 3, wherein the data element is further configured to have associated therewith an object class term qualifier that semantically restricts the object class term, wherein the data type further comprises an additional qualifier term that further semantically restricts the data type, and wherein the operations further comprise assigning the additional qualifier term of the data type to the object class term qualifier.

5. The computer program product of claim 3, wherein the data element is further configured to have associated therewith a property term qualifier that semantically restricts the property term, wherein the data type further comprises an additional qualifier term that farther semantically restricts the data type, and wherein the operations further comprise assigning the additional qualifier term of the data type to the property term qualifier.

6. The computer program product of claim 2, wherein the qualifier term is assigned to the property term upon a determination that the qualifier term is not identical with the aggregate class term.

7. The computer program product of claim 1, wherein the data element is further configured to have associated therewith a property term qualifier that semantically restricts the property term and an object class term qualifier that semantically restricts the object class term, and wherein the operations further comprise receiving an additional qualifier term from a user and assigning the additional qualifier term to at least one of the property term qualifier and the object class term qualifier.

8. The computer program product of claim 1, wherein the data type further comprises a data type term that is semantically restricted by the qualifier term, wherein the data element is further configured to have associated therewith a representation term, and wherein the data type term is assigned to the representation term.

9. The computer program product of claim 1, wherein the data type further comprises additional qualifier terms, wherein each additional qualifier term farther semantically restricts the data type.

10. The computer program product of claim 9, wherein the data element is further configured to have associated therewith a property term qualifier that semantically restricts the property term, wherein the operations farther comprise assigning an additional qualifier term of the data type to the property term qualifier upon a determination that the additional qualifier term is not identical with a term in the name of the aggregate data element and assigning the additional qualifier term of the data type to at least a portion of the object class term of the data element upon a determination that the additional qualifier term is identical with a term in the name of the data aggregate element.

11. The computer program product of claim 9, further wherein each qualifier term is associated with a restriction in values the data type may represent.

12. The computer program product of claim 11, wherein the operations farther comprise associating a new data type definition with each restricted data type.

13. The computer program product of claim 1, wherein the data type is an aggregate data type.

14. The computer program product of claim 1, wherein the data element is at least one of a basic business information entity and an association business information entity compatible with Core Components Technical Specification.

15. The computer program product of claim 1, wherein the qualifier term is a variable qualifier term that is a place holder for another qualifier term.

16. The computer program product of claim 15, wherein the variable qualifier term includes all capital letters and begins and ends with non-alphanumeric symbols.

17. A system for assigning a name to at least one element that represents business information, the system comprising:
  a processor; and
  a memory including at least:
    (i) a data element configured to have associated therewith an object class term that represents a logical grouping to which the data element is associated, and a property term that represents a characteristic of the logical grouping;
    (ii) an aggregate data element that defines the logical grouping;
    (iii) a data type that defines values that are valid for being assigned to the data element, wherein the data type comprises a qualifier term that represents an additional semantic restriction describing the data type; and
    (iv) a name assignor that assigns the qualifier term to a selected one of the property term and the object class term of the data element based upon a name of the aggregate data element, wherein the name of the aggregate data element comprises an aggregate class term, that determines whether the qualifier term is identical to the aggregate class term, wherein the qualifier term is assigned to the object class term upon a determination that the qualifier term is identical with the aggregate class term, and wherein the qualifier term is assigned to the property term upon a determination that the qualifier term is not identical with the aggregate class term, and that associates at least the object class term, the property term and the qualifier term assigned to one of the object class term and the property term into a name for the data element.

18. A computer program product tangibly embodied in a computer-readable medium, the computer program product including executable instructions for performing operations for naming at least one of several data elements that can identify business information in a communication, the operations comprising:
  selecting a data type, based on a user input designating the data type, that defines values that are valid for being assigned to a data element, the data type comprising a qualifier term that represents an additional semantic restriction describing the data type, the data type including a restriction of a physical representation of the value associated with the additional semantic restriction;
  performing an assignment of the data type term to a representation term, wherein the data element includes at least an object class term, a property term, and the representation term, wherein the object class term represents a logical grouping to which the data element belongs, and the property term represents a characteristic of the logical grouping;
  determining whether the qualifier term of the data type matches an aggregate data element name, including comparing a name of an aggregate data element to the qualifier term, wherein the name of the aggregate data element includes an aggregate class term, wherein the aggregate class term semantically defines the logical grouping;
  upon a determination that the qualifier term is identical with the aggregate class term, assigning the qualifier term to the object class term;
  upon a determination that the qualifier term is not identical with the aggregate class term, assigning the qualifier term to the property term and determining whether an additional qualifier term matches the name of the aggregate data element, wherein upon a determination that the additional qualifier term is identical to the name of the aggregate data element, the additional qualifier term is assigned to the object class term, and wherein upon a determination that the additional qualifier term is not identical to the name of the aggregate data element, the additional qualifier term is assigned to the property term as a qualifier; and
  associating at least the object class term, the property term and the qualifier term assigned to one of the object class term and the property term into a name for the data element.

* * * * *